M. E. PUE.
BRAKE OPERATING DEVICE.
APPLICATION FILED OCT. 20, 1913.
1,103,686.
Patented July 14, 1914.
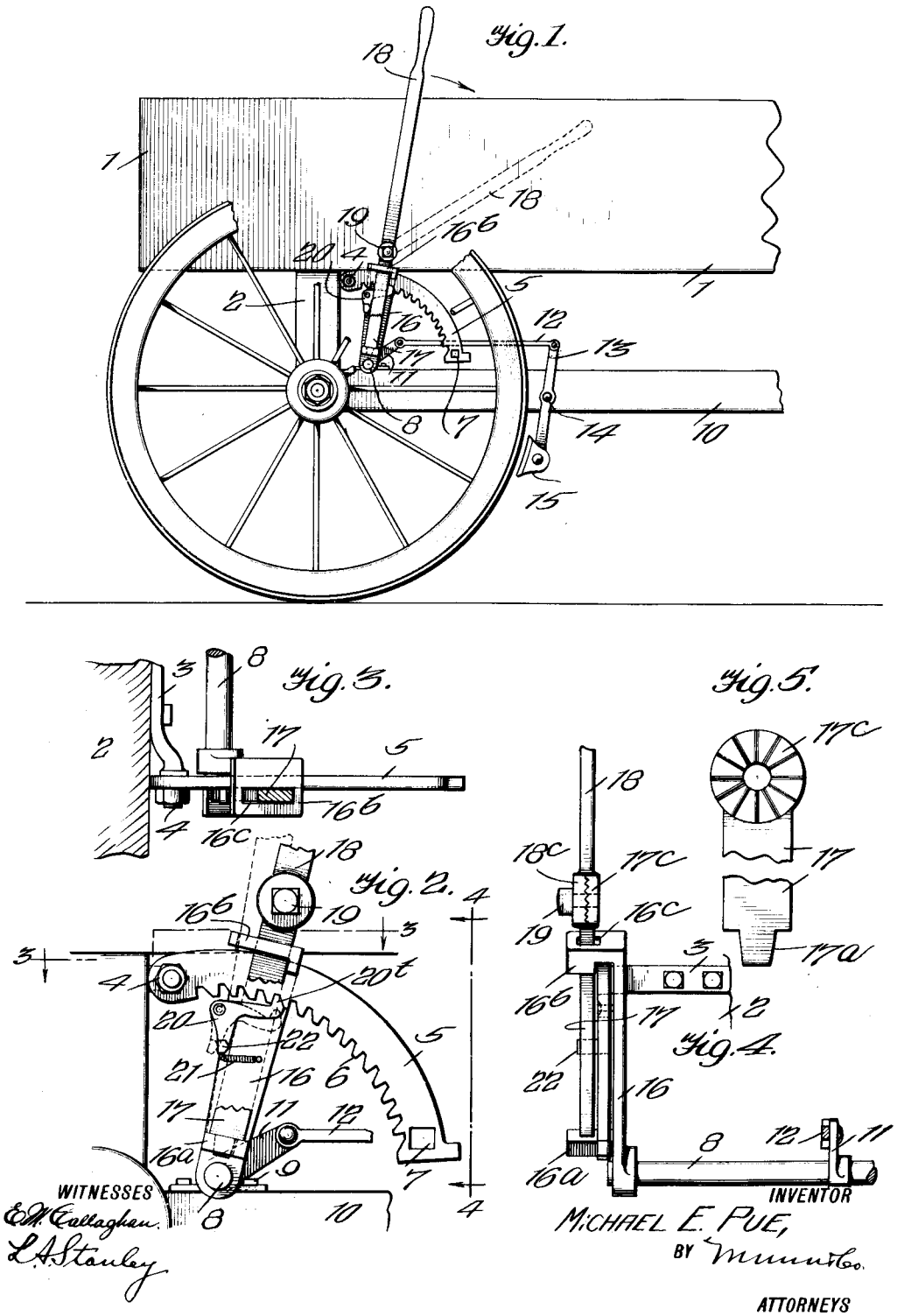
MICHAEL E. PUE, INVENTOR
BY
ATTORNEYS

UNITED STATES PATENT OFFICE.

MICHAEL E. PUE, OF MARLINTON, WEST VIRGINIA.

BRAKE-OPERATING DEVICE.

1,103,686.  Specification of Letters Patent.  Patented July 14, 1914.

Application filed October 20, 1913. Serial No. 796,295.

*To all whom it may concern:*

Be it known that I, MICHAEL E. PUE, a citizen of the United States, and a resident of Marlinton, in the county of Pocahontas and State of West Virginia, have made certain new and useful Improvements in Brake-Operating Devices, of which the following is a specification.

My invention relates to improvements in devices for operating brakes on vehicles such as wagons and the like, and it consists in the combinations, constructions and arrangements herein described and claimed.

An object of my invention is to provide a brake operating device which will positively hold the brake in its operative position, but which may be easily moved to release the same with a minimum effort.

A further object of my invention is to provide a removable lever which may be taken out when the wagon is being loaded, and which may be replaced when the loading is finished, thereby facilitating the loading operation.

A further object of my invention is to provide a pivoted locking segment which, by its own weight, insures the engagement of the locking pawl, thereby preventing the disengagement of the brake through a movement of the brake lever due to the jolting of the vehicle.

Other objects and advantages will appear in the following specification and the novel features of the device will be particularly pointed out in the appended claims.

My invention is illustrated in the accompanying drawings forming part of this specification in which—

Figure 1 is a view of my improved brake mechanism as applied to the frame, Fig. 2 is an enlarged side view of a portion of the brake operating mechanism, Fig. 3 is a section along the line 3—3 of Fig. 2, Fig. 4 is a section along the line 4—4 of Fig. 2, looking in the direction of the arrow, and Fig. 5 is a face view of the bottom lever member.

In carrying out my invention I make use of a vehicle such as the wagon shown in Fig. 1. Carried by the bolster 2 of the wagon is a bracket 3 (see Fig. 3) whose end forms a pivot 4 for a locking segment 5. The latter is provided with teeth 6 and has a square opening 7 at its free end. A rock shaft 8 is mounted in bearings 9 disposed on some convenient part of the frame such as the ridge 10. This rock shaft is provided with an arm 11 which is pivotally connected by means of a link 12 to a lever 13 which is pivoted at 14 and whose lower end bears the brake block 15. Mounted on the shaft 8 is an arm 16 which has a laterally extending lug 16$^a$ provided with an opening or socket arranged to receive the reduced end portion 17$^a$ of the lower brake lever member 17. The upper part of the arm 16 bears an integral lug 16$^b$ which has an elongated opening 16$^c$ (see Fig. 3) through which the lever member 17 may be extended. The upper part of the lever consists of a bar 18. Both the lever members 17 and 18 are provided with corrugated portions, such as those shown at 17$^c$ and 18$^c$, which may be held together by means of a bolt 19, thus the lever portion 18 may be set at an angle with respect to the lever portion 17 by loosening the bolt and then tightening it again when the two parts have been shifted. Pivotally carried by the arm 16 is a locking dog 20 which may be provided with one or more teeth 20$^t$ arranged to engage the teeth 6 of the locking segment 5. The dog is held in normal engagement with the segment by means of a spring 21. It is provided with a laterally extending lug 22 which is arranged to be engaged by the lever member 17 when the latter is moved toward the pivoted end of the locking segment 5.

From the foregoing description of the various parts of the device the operation thereof may be readily understood.

Consider the action of the device when the two lever members 17 and 18 are in alinement, as shown in Fig. 1. By the mere upward movement of the lever it may be withdrawn from the socket 16$^c$ so as to be out of the way in loading or unloading the wagon. When the wagon is loaded and the vehicle is in motion it is only necessary to press the lever forwardly in the direction shown by the arrow in Fig. 1 to cause the setting of the brake. As the lever is pressed forwardly the arm 16 carries the dog 20 forwardly, the tooth 20$^t$ of the latter riding over the teeth 6 of the locking segment. As soon as pressure on the lever handle 18 is released the brake is locked in its operative position. Now when it is desired to release the brake the lever is pulled in the opposite direction. The lower end of the lever, it should be stated, fits loosely in the socket and the lug 16$^a$ so that it now has a slight pivotal movement with this socket as a center. As soon as the edge of the lever engages the lug 22 the tooth 20ᵗ of the dog 20 is pulled out of engagement with the locking segment which then drops down and rests on the curved portion of the dog. The tooth being withdrawn, however, the lever may be moved to the rear, thereby releasing the brake. As soon as the tension is released from the lever the dog, under the action of the spring 21, will again assume its locking position.

A construction of this kind has several advantages. In the first place the fact that the locking segment 5 is only pivoted at one end insures the locking of the device because the weight of the segment will always cause it to assume a position in engagement with the tooth of the dog 20. Thus there is never any danger of the accidental movement of the lever due to jolting which might occur if the locking segment were secured at both ends. As shown however this does not prevent the rearward movement of the brake lever because when the brake lever is pulled toward the rear so as to withdraw the tooth of the dog the locking segment merely rests on the upper portion of the dog which is rounded to permit ready movement against the tooth of the locking segment.

It may be sometimes desirable to set the handle members 17 and 18 at angular positions with respect to one another. This may be done by loosening the bolt 19 and to facilitate the loosening of the bolt I provide the opening 7 in the locking segment 5 so that the latter may be removed and used as a wrench to start the bolt 19 and to again tighten it up.

I claim:

1. The combination with a rock shaft, an arm secured to one end of said rock shaft and being provided with upper and lower sockets, said upper socket being elongated, a brake lever arranged to pass through said upper socket and having a reduced portion arranged to enter the lower socket and to be pivotally supported therein, a spring-pressed locking dog carried by said arm, a locking segment pivoted at one end only and having teeth arranged to be engaged by said spring-pressed dog, and a lug carried by said dog and arranged to be engaged by the lever in its pivotal movement in the lower socket for withdrawing the dog from its locking engagement with the locking segment.

2. The combination with a rock shaft, an arm secured to one end of said rock shaft and being provided with upper and lower sockets, said upper socket being elongated, a brake lever arranged to pass through said upper socket and having a reduced portion arranged to enter the lower socket and to be pivotally supported therein, a spring-pressed locking dog carried by said arm, a locking segment pivoted at one end only and having teeth on its lower side arranged to be held by the weight of the segment in normal engagement with said spring-pressed dog, a lug carried by said dog and adapted to be engaged by the pivotal movement of the lever in its lower socket for withdrawing the dog from its locking engagement with the locking segment, a portion of said dog being shifted by the engagement of the lever with the lug into position to sustain the locking segment out of engagement with the dog while the lug on the dog is engaged by the lever.

MICHAEL E. PUE.

Witnesses:
L. A. STANLEY,
SOLON C. KEMON.